UNITED STATES PATENT OFFICE.

WILLIAM L. GREGG, OF PHILADELPHIA, PENNSYLVANIA.

MANUFACTURE OF BRICKS.

SPECIFICATION forming part of Letters Patent No. 301,359, dated July 1, 1884.

Application filed February 11, 1884. (No specimens.)

*To all whom it may concern:*

Be it known that I, WILLIAM L. GREGG, a citizen of the United States, residing at Philadelphia, in the county of Philadelphia and State of Pennsylvania, have invented certain new and useful Improvements in Bricks; and I do hereby declare the following to be a full, clear, and exact description of the invention, such as will enable others skilled in the art to which it appertains to make and use the same.

My invention relates to the manufacture of bricks, tiles, and similar articles; and it consists in producing an ornamental article of this kind made of two or more clays that will burn different colors, and which, on completion, will present a mottled appearance, by the method hereinafter described.

It is well known that clays burn different colors, due to the variation of their chemical constituents. Thus the clays of Milwaukee and Racine, Wisconsin, being free from iron, burn white and cream-colored. Other clays in the same State burn red, as the clays of other sections. Some clays burn chocolate, brown, pink, yellow, buff, &c. If these clays were mixed together by the ordinary hand process, whereby the clay is pugged or puddled, they would blend into one solid color or shade and not produce the effect desired by my process, but which is easily attained as follows: The clays are all handled separately, and each variety as taken in its natural state from the bank is first passed through rollers, preferably cone-shaped, to remove all stone and foreign substances. It is then passed through a disintegrating-machine, which reduces it to the form of coarse moist sawdust, not wet enough, however, to blend into a homogeneous mass, but sufficiently moist to hold each small mass together. If the clay had been previously dried, the result would be destroyed, as the clay would be reduced to powder in the mill, and the different clays would then mix and blend the same as by pugging or puddling; but in the moist or medium state each small portion forming the "mottle," so to speak, is held together separately until entering the mold. After all the clays desired to be incorporated into the mottled brick are first prepared separately, as described, they are fed together simultaneously into another mixing-mill containing stirrers or mixers, and the mass is thoroughly mixed, but each small pellet of clay retains its identity. The mass is then passed through a suitable pressure brick-machine or molded by hand, which completes the operation of forming or pressing the clay into bricks. They are then burned in the usual way, the fire developing not only on the face of the brick but through its entirety the mottled appearance. Thus, among innumerable other articles for building and ornamental purposes, excellent tiling is produced which will show the mottled appearance all the way through when broken or worn off by constant travel.

Having thus described my invention, what I claim, and desire to secure by Letters Patent, is—

1. The process herein described of producing a brick or similar article composed of two or more clays that will burn different colors, by first preparing the clays separately, removing all stone and foreign substances, and disintegrating the same; second, mixing the clays thus separately prepared; third, molding the mixture into the desired form, and burning the same.

2. A brick or similar article composed of two or more clays that will burn different colors and having a mottled appearance, substantially as described.

In testimony whereof I affix my signature in presence of two witnesses.

WILLIAM L. GREGG.

Witnesses:
 DAVID C. DENNEY,
 R. M. GREINER.